United States Patent [19]

Kobayashi et al.

[11] Patent Number: 5,527,873
[45] Date of Patent: Jun. 18, 1996

[54] METHOD FOR THE PREPARATION OF SILICONE RESINS

[75] Inventors: Hideki Kobayashi; Wataru Nishiumi, both of Chiba Prefecture, Japan

[73] Assignee: Dow Corning Toray Silicone Co., Ltd., Tokyo, Japan

[21] Appl. No.: 389,869

[22] Filed: Feb. 17, 1995

[30] Foreign Application Priority Data

Feb. 18, 1994 [JP] Japan .................................. 6-045164

[51] Int. Cl.$^6$ .................................................. C08G 77/06
[52] U.S. Cl. .............................. 528/23; 525/478; 528/31; 528/39
[58] Field of Search ................................. 528/23, 31, 39; 525/478

[56] References Cited

U.S. PATENT DOCUMENTS

| | | | |
|---|---|---|---|
| 2,676,182 | 4/1954 | Daudt et al. | 260/448.2 |
| 2,814,601 | 11/1957 | Currie et al. | 260/29.1 |
| 2,857,356 | 10/1958 | Goodwin | 260/42 |
| 4,707,531 | 11/1987 | Shirahata | 528/12 |
| 5,292,586 | 3/1994 | Lin et al. | 525/478 |
| 5,344,905 | 9/1994 | Morita | 528/31 |

*Primary Examiner*—Melvyn I. Marquis
*Attorney, Agent, or Firm*—Timothy J. Troy

[57] ABSTRACT

The present invention relates to a method for the preparation of silicone resins, the method comprising the steps of (I) mixing (a) a silicone resin, (b) an organic solvent, and (c) an acid catalyst to form a reaction product, and (II) reacting a diorganopolysiloxane or tetraorganodisiloxane with the reaction product of (I) at a temperature of 50° C. to 150° C. The present invention also relates to resins produced by the method of the present invention.

20 Claims, No Drawings

METHOD FOR THE PREPARATION OF SILICONE RESINS

BACKGROUND OF THE INVENTION

The present invention relates to a method for the preparation of silicone resins. More particularly, the present invention relates to a method for the preparation of silicon-bonded hydrogen (SiH)—containing silicone resins.

Silicone resins, which may be liquid or solid at ambient temperature, have long been known and at present are used in numerous applications, for example, as electrical-insulating varnishes, heat-resistant coatings, and sealants for semiconductor elements. Silicone resins may be classified into several categories as a function of the particular combination of siloxane units. Already well known are the MQ silicone resins, which consist of monofunctional siloxane unit $R_3SiO_{1/2}$ (M unit) and tetrafunctional siloxane unit $SiO_{4/2}$ (Q unit), and the MDQ silicone resins, which consist of M, Q, and difunctional siloxane unit $R_2SiO_{2/2}$ (D unit).

Methods known for the preparation of these silicone reasons have been described. For example, Daudt et al. in U.S. Pat. No. 2,676,182 and Currie et al. in U.S. Pat. No. 2,814,601 teach that silicone resins can be prepared by converting a water-soluble silicate (such as water glass or sodium orthosilicate) into a silicic acid monomer or silicic acid oligomer using, for example, hydrochloric acid or sulfuric acid, and, when an adequate polymerization has been achieved, trapping with trimethylchlorosilane to yield the MQ silicone resin.

Goodwin, in U.S. Pat. No. 2,857,356, discloses a method for the preparation of a silicone resin by the cohydrolysis of an alkyl silicate and a hydrolyzable trialkylsilane mixture through the addition of water to yield an MQ silicone resin.

A problem associated with the MQ silicone resins synthesized by Daudt et al. and Currie et al. above is the large amount of silanol that remains in their resins. When the method of Goodwin is employed by using a trialkylalkoxysilane as the hydrolyzable trialkylsilane, silanol and large amounts of alkoxy groups remain in the synthesized MQ silicone resin. As a result, when the synthesis of a SiH-containing MQ silicone resin is attempted by these methods through the addition of dimethylchlorosilane ($Me_2HSiCl$) or methyldichlorosilane ($MeHSiCl_2$), the residual silanol and residual alkoxy react with the silicon-bonded hydrogen (Si—H), which prevents quantitative introduction of the Si—H group. Moreover, even after the successful introduction of the Si—H group, the residual silanol and residual alkoxy in the silicone resin slowly react with the Si—H, thereby creating the problem of poor storage stability. An additional problem with the cited methods is the difficulty in using them to prepare high-molecular-weight SiH-containing silicon resins.

Shirahate, in U.S. Pat. No. 4,707,531, discloses a method for producing an MQ resin by dripping an alkyl silicate (alkyl orthosilicate or a partial hydrolysis condensate of alkyl orthosilicate) into a mixture of aqueous hydrochloric acid which contains at least 5% hydrogen chloride and a trialkylsilane or a disiloxane or a mixture thereof, at a temperature of from 0° to 90° C. with stirring. This method is problematic from the standpoint of environmental pollution because it generates an aqueous hydrochloric acid solution containing large amounts of methanol as an effluent. It is also difficult to apply this method to the preparation of high-molecular-weight SiH-containing silicone resin.

SUMMARY OF THE INVENTION

The present invention relates to a method for the preparation of silicone resins, the method comprising the steps of (I) mixing (a) a silicone resin, (b) an organic solvent, and (c) an acid catalyst to form a dehydration condensation reaction product, and (II) reacting a diorganopolysiloxane with the reaction product of (I) at a temperature of 50° C. to 150° C. This method of the present invention produces silicone resins having the average unit formula $(R_3SiO_{1/2})_a(RHSiO_{2/2})_b(R_2SiO_{2/2})_c(SiO_{4/2})$ wherein R denotes a monovalent hydrocarbon group or a haloalkyl group, a has a value of from 0.2 to 3, b has a value of from greater than zero to 2, and c has a value of from 0 to 2.

The present invention further relates to a method for the preparation of silicone resins, the method comprising the steps of (I) mixing (a) a silicone resin, (b) an organic solvent, and (c) an acid catalyst to form a dehydration condensation reaction product, and (II) reacting a tetraorganodisiloxane with the reaction product of (I) at a temperature of 50° C. to 150° C. This method of the present invention produces silicone resins having the average unit formula $(R_3SiO_{1/2})_{a'}(R_2HSiO_{1/2})_{b'}(SiO_{4/2})$ wherein R denotes a monovalent hydrocarbon group or a haloalkyl group, a' has a value of from 0.2 to 3, and b' has a value of from greater than zero to 2.

It is an object of the present invention to introduce a novel method for the preparation of SiH-containing MQ silicone resins and SiH-containing MDQ silicone resins.

It is another object of the present invention to introduce a method of readily preparing MQ silicone resins which are solid at room temperature, have a number-average molecular weight of at least 1,000, and a softening point of at least 100° C.

It is a further object of this invention to prepare SiH-containing silicone resins having a high molecular weight and containing a relatively small amount of low-molecular-weight siloxanes.

DETAILED DESCRIPTION OF THE INVENTION

The first embodiment of the present invention relates to a method for the preparation of silicone resins, the method comprising the steps of (I) mixing (a) a silicone resin having the average unit formula $(R_3SiO_{1/2})_x(SiO_{4/2})$, (b) an organic solvent, and (c) an acid catalyst, wherein each R independently denotes a monovalent hydrocarbon group or a haloalkyl group and x has a value of from 0.2 to 3 to form a dehydration condensation reaction product, (II) reacting with the reaction product of (I) at a temperature of 50° C. to 150° C., (d) a diorganopolysiloxane having the average unit formula $(R^1HSiO_{2/2})_y(R^1_2SiO_{2/2})_z$ wherein $R^1$ denotes a monovalent hydrocarbon group or a haloalkyl group, y has a value of 1 to 100, and z has a value of 0 to 100.

Component (a) used in this method of the invention comprises a silicone resin having the average unit formula $(R_2SiO_{1/2})_x(SiO_{4/2})$, wherein each R independently denotes a monovalent hydrocarbon group or a haloalkyl group and x has a value of from 0.2 to 3. Thus component (a) comprises $(R_3SiO_{1/2})_x$ units and $(SiO_{4/2})$ units. The group R is specifically exemplified by alkyl groups such as methyl, ethyl, propyl, and butyl, alkenyl groups such as vinyl, allyl, butenyl, and hexenyl, aryl groups such as phenyl, tolyl, and xylyl, aralkyl groups such a benzyl and phenethyl, and haloalkyl groups such a chloromethyl and 3,3,3-trifluoropropyl. It is preferred that R is selected from vinyl or methyl. The subscript x has a value of 0.2 to 3 and preferably has a value of 0.6 to 11.

The silicone resins of component (a) are known and these resins can be prepared, for example, by the methods disclosed in U.S. Pat. Nos. 2,676,182, 2,814,601, and 2,857,356. Silicone resins of this type generally contain at least 0.2 weight % of silanol groups.

It is preferred in this method of the invention that the silicone resins (a) are selected from compounds having the average unit formulae: $(Me_2SiO_{1/2})_{0.4}(SiO_{4/2})$, $(Me_3SiO_{1/2})_{0.3}(CH_2=CHSiMe_2O_{1/2})_{0.1}(SiO_{4/2})$, and $(Me_3SiO_{1/2})_{0.4}(CH_2=CHC_4H_8SiMe_2O_{1/2})_{0.1}(SiO_{4/2})$, and $(Me_3SiO_{1/2})_{0.4}(C_9H_{27}SiMe_2O_{1/2})_{0.1}(SiO_{4/2})$ wherein Me denotes methyl.

Component (b) in this method of the invention is an organic solvent. Organic solvents suitable as (b) are exemplified by aromatic hydrocarbons such as benzene, toluene, and xylene, alkanes such as hexane and heptane, ethers such as diethyl ether and tetrahydrofuran, ketones such as acetone and methyl isobutyl ketone, halohydrocarbons such as 1,1,2-trichlorotrifluoroethane, 1,1,1-trichloroethane, dichloromethane, alpha,alpha,alpha-trifluorotoluene, and hexafluoroxylene, and alcohols such as methanol, ethanol, and isopropanol.

Component (c) in this method of the invention is an acid catalyst. Acid catalyst suitable as (c) are preferably those acid catalysts heretofore known for use in the polymerization of polydioganosiloxanes. Specific examples of such acid catalysts include concentrated sulfuric acid, trifluoromethanesulfonic acid, dodecylbenzenesulfonic acid, acid clay, and sulfonic acid group-containing organic resins in the form of finely divided powders. The acid catalyst (c) is used in order to eliminate the silanol and alkoxy remaining in the silicone resin (a) during the dehydration condensation reaction of step (I). It is also used to catalyze the re-equilibration reaction with the diorganopolysiloxane comprising component (d) described hereinbelow. The acid catalyst is preferably added in an amount of at least 100 ppm in the reaction system.

The reaction which occurs upon the mixing of acid catalyst (c) with components (a) and (b) during step (I) consists of a dehydration condensation reaction among the silanol groups present in silicone resin (a). The reflux temperature of the organic solvent is preferably used as the reaction temperature, and water of condensation is removed by azeotropic water elimination using a water separator. Completion of the condensation reaction is confirmed by cessation of the evolution of the water by-product from the reaction. This process consumes the silanol present in silicone resin (a) with the concomitant product of siloxane.

Component (d) in this method of the invention comprises an diorganopolysiloxane having the average unit formula $(R^1HSiO_{2/2})_y(R^1_2SiO_{2/2})_z$, wherein $R^1$ denotes a monovalent hydrocarbon group or a haloalkyl group, y has a value of 1 to 100, and z has a value of 0 to 100 and thus comprises SiH-containing diorganopolysiloxanes. Thus component (d) comprises $(R^1HSiO_{2/2})_y$ units and $(R^1_2SiO_{2/2})_z$ units. The monovalent hydrocarbon groups of $R^1$ in the instant formula are as denoted above for R in component (a) above including preferred embodiments thereof.

The diorganopolysiloxane (d) is preferably selected from compounds having the average unit formulae: $Me_3SiO(HMeSiO_{2/2})_{20}SiMe_3$, $Me_3SiO(HMeSiO_{2/2})_{15}(Me_2SiO_{2/2})_5SiMe_3$, $Me_3SiO(HMeSiO_{2/2})_{10}(C_3H_7MeSiO_{2/2})_3SiMe_3$, $(HMeSiO_{2/2})_4$, and $(HMeSiO_{2/2})_2(Me_2SiO_{2/2})_2$.

The reaction product from step (I) is re-equilibrated with diorganopolysiloxane (d) in this method of the invention. The solids concentration at this point must be adjusted to a concentration at which precipitation of the silicone resin does not occur, and in general is preferably at about 1 to 90 weight % and particularly preferably is about 5 to 70 weight %. The re-equilibration reaction becomes nonuniform at a solids concentrations in excess of 90 weight %, which prevents synthesis of the target SiH-containing silicone resin with good reproducibility. At the other extreme, high molecular weights cannot be obtained for the SiH-containing silicone resin product at a solids concentration of below 1 weight %. The solids concentration can be measured by distillation of the organic solvent and other volatiles from the reaction mixture after the condensation reaction of step (I).

The reaction temperature and time of step (II) should be selected as appropriate based on measurement of the development of the reaction through sampling and analysis, for example, by gel permeation chromatography. The reaction is preferably run at 50° C. to 150° C. After the reaction, the acid catalyst is removed by neutralization of the reaction product with base (when necessary) and filtration.

The silicone resin produced by this method of the invention comprises a redistributed and homogenized silicone resin having the average unit formula:

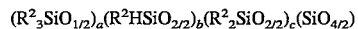

$$(R^2_3SiO_{1/2})_a(R^2HSiO_{2/2})_b(R^2_2SiO_{2/2})_c(SiO_{4/2})$$

where $R^2$ is a monovalent hydrocarbon group or a haloalkyl group, a has a value of 0.2 to 3, b has a value of from greater than zero to 2, and c has a value of from 0 to 2. Thus the silicone resins produced by this embodiment of the invention comprise $(R^2_3SiO_{1/2})_a$ units, $(R^2HSiO_{2/2})_b$ units, $(R^2_2SiO_{2/2})_c$ units, and $(SiO_{4/2})$ units. The monovalent hydrocarbon groups or haloalkyl groups of $R^2$ are as defined for R above including preferred embodiments thereof.

The second embodiment of the present invention relates to a method for the preparation of silicone resins, the method comprising the steps of (I) mixing (a) a silicone resin having the average unit formula $(R_3SiO_{1/2})_x(SiO_{4/2})$, (b) an organic solvent, and (c) an acid catalyst, wherein each R independently denotes a monovalent hydrocarbon group or a haloalkyl group and x has a value of from 0.2 to 3 to form a dehydration condensation reaction product, and (II) reacting with the reaction product of (I) at a temperature of 50° C. to 150° C., (d) a tetraorganodisiloxane having the average unit formula $(R^3_2HSi)_2O$ wherein $R^3$ denotes a monovalent hydrocarbon group. Components (a), (b), and (c) are as delineated above in the first embodiment of this invention, including preferred amounts and embodiments thereof.

The monovalent hydrocarbon groups or haloalkyl groups of $R^3$ in component (d) are as defined for R above including preferred embodiments thereof. The tetraorganodisiloxane (d) is preferably selected from compounds having the average unit formula $(HMeSi)_2O$ or $(HMeEtSi)_2O$ wherein Me denotes methyl and Et denotes ethyl. The solids concentration, reaction time, and reaction temperature are as delineated above in the first embodiment of this invention including preferred amounts thereof.

The second embodiment of the present invention produces silicone resins having the average unit formula $(R^4_3SiO_{1/2})_{a'}(R^4_2HSiO_{1/2})_{b'}(SiO_{4/2})$ wherein $R^4$ denotes a monovalent hydrocarbon group or a haloalkyl group, a' has a value of from 0.2 to 3, and b' has a value of from greater than zero to 2. Thus the silicone resins produced by the second method of this invention comprises $(R^4_3SiO_{1/2})_{a'}$ units, $(R^4_3HSiO_{1/2})_{b'}$ units, and $(SiO_{4/2})$ units. The monovalent hydrocarbon groups or haloalkyl group of $R^4$ are as defined for R above including preferred embodiments thereof.

The methods of this invention makes it possible to synthesis the SiH-containing MQ silicone resins described above. Moreover, the methods according to the invention are very readily applied to the synthesis of MQ silicone resins which are solid at room temperature, have a number-average molecular weight of at least 1,000, and have a softening point of at least 100°.

SiH-containing silicone resins produced by the methods of this invention which have a high molecular weight and contain relatively small amounts of low-molecular-weight siloxanes are useful in curable silicone coating compositions such as silicone release coating compositions (i.e. they improve the tack/release properties of siloxane compositions), are useful as electrical-insulating varnishes, as heat-resistant film-forming agents for use in association with electrical/electronic components, and as sealants for semiconductor devices. In the examples hereinbelow, the viscosity values were measured at 25° C. and Me denotes methyl.

EXAMPLE 1

Using the method described in U.S. Pat. No. 2,676,182, sodium silicate was converted into a silicic acid oligomer and polymerized using aqueous hydrochloric acid, and trapping was carried out with trimethylchlorosilane in the presence of xylene and isopropyl alcohol. The product was a xylene solution (70 weight % solids, hereinafter designated as (MQ-1) of MQ silicone resin having the formula $(Me_3SiO_{1/2})_{0.75}(SiO_{4/2})$. Analysis of FT-IR (fourier transform infrared absorption spectroscopy) showed the presence of a sharp absorption at 3,700 cm$^{-1}$ for free silanol and a broad absorption centered at 3,500 cm$^-$ for intramolecular silanol and water. Xylene (57 g) was added to 143 g of the xylene solution of MQ silicone resin in a 300-cc flask, and acid clay (0.8 g) was added with mixing to homogeneity. A dehydration condensation reaction was then run by heating this mixture at the reflux temperature. The evolved water was distilled out using a water separator, and a total of 0.9 g water was recovered. The resulting silicone resin solution was again measured by FT-IR, which showed that the absorption at 3,700 cm$^-$ had disappeared and the absorption centered at 3,500 cm$^{-1}$ had almost disappeared.

Polymethylhydrogensiloxane (10 g) having the formula $Me_3SiO(MeHSiO)_2SiMe_3$ and a viscosity of 20 mm$^2$/s was added and a reaction was run for 6 hours at 90° C. After cooling, filtration was used to removed the catalyst which yielded a xylene solution of silicone resin. Removal of the xylene from this solution gave silicone resin in the form of a white powder at room temperature. This silicone resin had a softening point, as measured by evaluation with a microscope, of 200° C. and a number-average molecular weight, as measured by gel permeation chromatography (GPC), of 5,000. It contained 0.14 weight % Si—H functional groups, which was almost equal to the amount charged. Analysis by $^{29}$Si NMR confirmed this product to be a compound having the average unit formula:

$(Me_3SiO_{1/2})_{0.75}(MeHSiO)_{0.19}(SiO_{4/2})_a$

EXAMPLE 2

Xylene (57 g) was added to 143 g of the xylene solution of silicone resin prepared in Example 1 (MQ-1), and acid clay (0.8 g) was then added. An azeotropic water elimination was run, and the water from condensation was removed using a water separator. Organodisiloxane (8 g) with the formula $HMe_2SiOSiMe_2H$ was subsequently added and a reaction was run for 8 hours at 70° C. After cooling, filtration was used to remove the catalyst which yielded a xylene solution of silicone resin. Removal of the xylene from this solution gave silicone resin in the form of a white powder at room temperature. This silicone resin had a softening point of at least 300° C. and a number-average molecule weight, as measured by gel permeation chromatography (GPC), of 4,900. This silicone resin contained 0.09 weight % Si—H functional groups. Analysis by $^{23}$Si NMR confirmed this product to be a compound having the average unit formula:

$(Me_3SiO_{1/2})_{0.75}(HMe_2SiO_{1/2})_{0.1}(SiO_{4/2})$,

EXAMPLE 3

Xylene (57 g) was added to 143 g of the xylene solution of silicone resin prepared in Example 1 (MQ-1), and acid clay (0.8 g) was then added. An azeotropic water elimination was run, and the water from condensation was removed using a water separator. Polyorganosiloxane (11.1 g) having the unit formula $(HMeSiO)_x(Me_2SiO)_y$ (and having a ratio of x:y of about 1:1) was subsequently added and a reaction was run for 6 hours at 90° C. After cooling, filtration was used to removed the catalyst which yielded a xylene solution of silicone resin. Removal of the xylene from this solution gave silicone resin in the form of a white powder at room temperature. This silicone resin had a softening point of 190° C. and a number-average molecule weight, as measured by gel permeation chromatography (GPC), of 5,100. It contained 0.07 weight % Si—H functional groups. Analysis of this silicone resin by $^{29}$Si NMR confirmed it to be a compound having the average unit formula:

$(Me_3SiO_{1/2})_{0.75}(HMeSiO_{3/2})_{0.1}(Me_2SiO_{2/2})_{0.1}(SiO_{4/2})_a$

COMPARATIVE EXAMPLE 1

Using the method described in U.S. Pat. No. 2,857,356, 144 parts water was added dropwise to 100 parts trimethylchlorosilane, 10 parts dimethylchlorosilane, 370 parts ethyl orthosilicate, and 250 parts toluene while mixing and maintaining a temperature no greater than 80° C. Thereafter, the organic layer was separated, washed with aqueous sodium bicarbonate until it was neutral, and filtered. Silicone resin was recovered by stripping off the solvent. Measurement of the Si—H functional group in this silicone resin detected only 40% of the Si—H calculated from the quantity of dimethylchlorosilane charged, which indicated that the remaining 60% had been consumed during syntheses.

Thus the methods according to the present invention are highly efficient in preparation of SiH-containing MQ silicone resins and SiH-containing MDQ silicone resins in contrast to methods described heretofore in the art.

That which is claimed is

1. A method for the preparation of silicone resins, the method comprising the steps of:
   (I) mixing:
   (a) a silicone resin having the average unit formula $(R_3SiO_{1/2})_x(SiO_{4/2})$;
   (b) an organic solvent; and
   (c) an acid catalyst;

wherein each R is independently selected from the group consisting of monovalent hydrocarbon groups and haloalkyl groups, and x has a value of from 0.2 to 3 to form a dehydration condensation reaction product; and (II) reacting the reaction product of (I) at a temperature of 50° C. to 150° C. with:

(d) a diorganopolysiloxane having the average unit formula $(R^1HSiO_{2/2})_y(R^1SiO_{2/2})_z$ wherein $R^1$ is independently selected from the group consisting of monovalent hydrocarbon groups and haloalkyl groups, y has a value of 1 to 100, and z has a value of 0 to 100.

2. A method according to claim 1, wherein R is selected from the group consisting of alkyl groups, alkenyl groups, aryl groups, aralkyl groups, and haloalkyl groups.

3. A method according to claim 2, wherein the alkyl group is methyl, and the alkenyl group is selected from vinyl or hexenyl.

4. A method according to claim 1, wherein x has a value of 0.6 to 1.1.

5. A method according to claim 1, wherein (b) is selected from the group consisting of aromatic hydrocarbons, alkanes, ethers, ketones, halohydrocarbons, and alcohols.

6. A method according to claim 5, wherein the aromatic hydrocarbons are selected from benzene, toluene, or xylene, the alkanes are selected from hexane or heptane, the ethers are selected from diethyl ether or tetrahydrofuran, the ketones are selected from acetone or methyl isobutyl ketone, the halohydrocarbons are selected from 1,1,2-trichlorotrifluoroethane, 1,1,1-trichloroethane, dichloromethane, alpha,alpha,alpha-trifluorotoluene, or hexafluoroxylene, and the alcohols are selected from methanol, ethanol, or isopropanol.

7. A method according to claim 1, wherein (c) is selected from the group consisting of sulfuric acid, trifluoromethanesulfonic acid, dodecylbenzenesulfonic acid, acid clay, and sulfonic acid group-containing organic resins.

8. A silicone resin having the average unit formula:

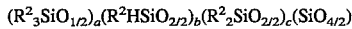

$(R^2{}_3SiO_{1/2})_a(R^2HSiO_{2/2})_b(R^2{}_2SiO_{2/2})_c(SiO_{4/2})$ wherein $R^2$ is selected from the group consisting of monovalent hydrocarbon groups and haloalkyl groups, a has a value of 0.2 to 3, b has a value of from greater than zero to 2, and c has a value of from 0 to 2.

9. A resin according to claim 8, wherein $R^2$ is selected from the group consisting of alkyl groups, alkenyl groups, aryl groups, aralkyl groups, and haloalkyl groups.

10. A resin according to claim 9, wherein the alkyl group is methyl, and the alkenyl group is selected from vinyl or hexenyl.

11. A method for the preparation of silicone resins, the method comprising the steps of:

(I) mixing:
(a) a silicone resin having the average unit formula 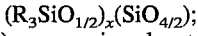 $(R_3SiO_{1/2})_x(SiO_{4/2})$;
(b) an organic solvent; and
(c) an acid catalyst;

wherein each R is independently selected from the group consisting of monovalent hydrocarbon groups and haloalkyl groups, and x has a value of from 0.2 to 3 to form a dehydration condensation reaction product; and (II) reacting the reaction product of (I) at a temperature of 50° C. to 150° C. with:

(d) a tetraorganodisiloxane having the average unit formula $(R^3{}_2HSi)_2O$ wherein $R^3$ is independently selected from the group consisting of monovalent hydrocarbon groups and haloalkyl groups, y has a value of 1 to 100, and z has a value of 0 to 100.

12. A method according to claim 11, wherein R is selected from the group consisting of alkyl groups, alkenyl groups, aryl groups, aralkyl groups, and haloalkyl groups.

13. A method according to claim 12, wherein the alkyl group is methyl, and the alkenyl group is selected from vinyl or hexenyl.

14. A method according to claim 11, wherein (b) is selected from the group consisting of aromatic hydrocarbons, alkanes, ethers, ketones, halohydrocarbons, and alcohols.

15. A method according to claim 14, wherein the aromatic hydrocarbons are selected from benzene, toluene, or xylene, the alkanes are selected from hexane or heptane, the ethers are selected from diethyl ether or tetrahydrofuran, the ketones are selected from acetone or methyl isobutyl ketone, the halohydrocarbons are selected from 1,1,2-trichlorotrifluoroethane, 1,1,1-trichloroethane, dichloromethane, alpha,alpha,alpha-trifluorotoluene, or hexafluoroxylene, and the alcohols are selected from methanol, ethanol, or isopropanol.

16. A method according to claim 11, wherein (c) is selected from the group consisting of sulfuric acid, trifluoromethanesulfonic acid, dodecylbenzenesulfonic acid, acid clay, and sulfonic acid group-containing organic resins.

17. A method according to claim 11, wherein (d) is a compound having its average unit formula selected from: $(HMe_2Si)_2O$ or $(HMeEtSi)_2O$ wherein Me denotes methyl and Et denotes ethyl.

18. A method according to claim 1, wherein (a) is a compound having its average unit formula selected from the groups consisting of: $(Me_3SiO_{1/2})_{0.4}(SiO_{4/2})$, $(Me_3SiO_{1/2})_{0.3}(CH_2=CHSiMe_2O_{1/2})_{0.1}(SiO_{4/2})$, $(Me_3SiO_{1/2})_{0.4}(CH_2=CHC_4H_8SiMe_2O_{1/2})_{0.1}(SiO_{4/2})$, and $(Me_3SiO_{1/2})_{0.4}(C_8H_{17}SiMe_2O_{1/2})_{0.1}(SiO_{4/2})$ wherein Me denotes methyl.

19. A method according to claim 1, wherein (d) is a compound having its average unit formula selected from the group consisting of: $Me_3SiO(HMeSiO_{2/2})_{20}SiMe_3$, $Me_3SiO(HMe_3SiO_{2/2})_{15}(Me_2SiO_{2/2})_5SiMe_3$, $Me_3SiO(HMeSiO_{2/2})_{10}(C_3H_7Me_2SiO_{2/2})_3SiMe_3$, $(HMe_2SiO_{2/2})_4$, and $(HMeSiO_{2/2})_2(Me_2SiO_{2/2})_2$ wherein Me denotes methyl.

20. A method according to claim 11, wherein (a) is a compound having its average unit formula selected from the groups consisting of: $(Me_3SiO_{1/2})_{0.4}(SiO_{4/2})$, $(Me_3SiO_{1/2})_{0.3}(CH_2=CHSiMe_2O_{1/2})_{0.1}(SiO_{4/2})$, $(Me_3SiO_{1/2})_{0.4}(CH_2=CHC_4H_8SiMe_2O_{1/2})_{0.1}(SiO_{4/2})$, and $(Me_3SiO_{1/2})_{0.4}(C_8H_{17}SiMe_2O_{1/2})_{0.1}(SiO_{4/2})$ wherein Me denotes methyl.

* * * * *